United States Patent [19]

Koch

[11] 4,086,787
[45] May 2, 1978

[54] DEVICE FOR TRANSMITTING FORCE FROM ONE SHAFT TO ANOTHER

[75] Inventor: Wilhelm Koch, Heidelberg, Germany

[73] Assignee: Brown, Boveri and Cie AG, Mannheim, Germany

[21] Appl. No.: 633,705

[22] Filed: Nov. 20, 1975

[30] Foreign Application Priority Data

Nov. 23, 1974 Germany .................... 2455549

[51] Int. Cl.² .................... F16D 3/62; F16D 23/00
[52] U.S. Cl. .................................. 64/10; 64/19; 64/12
[58] Field of Search ................... 64/31, 19, 12

[56] References Cited

U.S. PATENT DOCUMENTS

| | | | |
|---|---|---|---|
| 2,619,211 | 11/1952 | Belden | 64/10 |
| 2,722,548 | 12/1956 | Covington, Jr. et al. | 64/10 |
| 3,625,024 | 12/1971 | Kikuchi | 64/19 |
| 3,739,600 | 6/1973 | Perc | 64/19 |
| 3,926,012 | 12/1975 | Biermann | 64/19 |

*Primary Examiner*—Benjamin W. Wyche
*Assistant Examiner*—R. C. Turner
*Attorney, Agent, or Firm*—Herbert L. Lerner

[57] ABSTRACT

Device for transmitting force from one shaft to another wherein the latter is displaceable in radial and axial direction relative to the one shaft, includes a coupler having a first pair of guide rods, one end of the guide rods of said first guide rod pair being articulatingly connected with the one shaft, the other end of the guide rods being articulatingly connected to a respective end of the guide rods of a second guide rod pair, a middle guide rod articulatingly connected at both ends thereof to the respective other end of the guide rods of the second guide rod pair, a torque output joint for the other shaft articulatingly engaging the respective guide rods of the second guide rod pair between the respective articulating connection of the middle guide rod with the guide rods of the second guide rod pair and the respective articulating connection of the respective guide rods of the first guide rod pair with the guide rods of the second guide rod pair, the middle guide rod having a longitudinal axis extending at an inclination to a line extending through the central axis of the other shaft and disposed parallel to the respective longitudinal axis of the guide rods of the second guide rod pair in nondeflected condition of the coupler, the torque output joint, respectively, being located beyond the middle of a connecting line extending between the articulating connection of the respective guide rod of the second guide rod pair and the respective guide rod of the first guide rod pair and the articulating connection of the middle guide rod and the respective guide rod of the second guide rod pair, the guide rods of the first guide rod pair having thereon a respective torque input joint for the one shaft and having a respective elongated portion thereof extending beyond the respective torque input joint so as to be statically balanced by the mass of the elongated portion.

4 Claims, 5 Drawing Figures

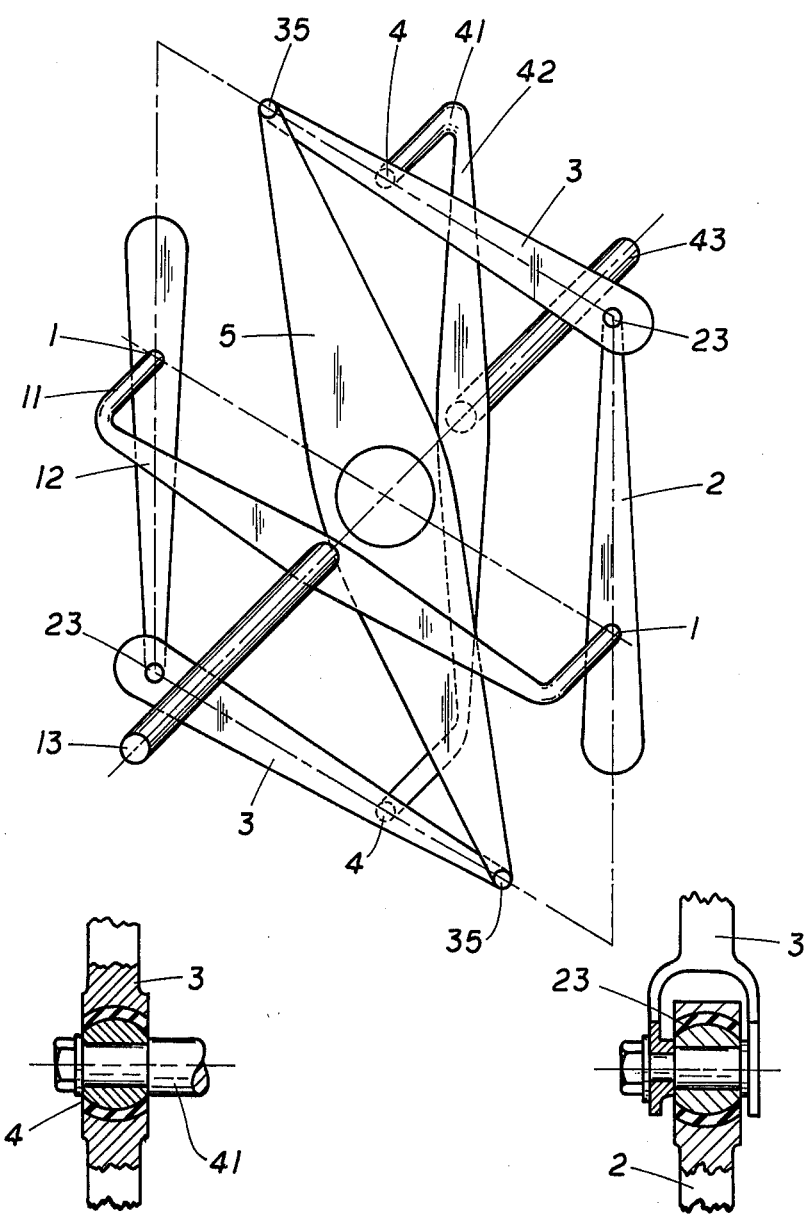

DEVICE FOR TRANSMITTING FORCE FROM ONE SHAFT TO ANOTHER

The invention relates to device for transmitting force from one shaft to another wherein the latter performs relative movements in radial and axial direction with respect to the one shaft, especially for transmitting force of a shaft driven by the drive motor of a rail motive power unit or driving rail car, such as a locomotive, to the drive shaft thereof.

To transmit the torque from an electric rail car drive motor, which is firmly connected to the frame of the mobile car or the bogie frame, to the set of movable driving wheels, so-called branching drives have become known heretofore. Such a drive is in a position to accommodate the main or the greatest movement which the set of driving wheels performs with respect to the car frame and thereby with respect to the drive motor that is fixed to the frame, namely the movement resulting from vertical or axial compression of the spring suspension. In electric locomotives, it is in the order of magnitude of ±35 mm out of the central position thereof.

In such branching drives, the drive motor can be optimally constructed with respect to motor diameter and axial length, e.g. the greatest possible electrical driving power per set of driving wheels can be accommodated.

Such branching drives have as a marked disadvantage, however, the production of imbalance forces during eccentric running i.e. when the suspension of the set of driving wheels is vertically compressed out of the mean position thereof. Moreover, in virtually all types of branching-drive constructions, angle invalidities are present which are produced out of the central position also during pulsations. These disadvantages are to be encountered in all types of branching drive constructions, of which the most important that have become known are the Buchli drive, the Alsthom drive and the Arlikon drive. The aforementioned imbalance forces occurring during eccentric running assume orders of magnitude for very rapidly traveling locomotives which exclude the use of these types of drive.

It is accordingly an object of the invention to provide a force transmission device of the aforementiond general type which avoids the foregoing disadvantages and is thus virtually free of imbalance and wherein the angle invalidities are only very slight.

With the foregoing and other objects in view there is provided in accordance with the invention, a device for transmitting force from one shaft to another wherein the latter is displaceable in radial and axial direction relative to the one shaft, the device comprising a coupler including a first pair of guide rods, one end of the guide rods of the first guide rod pair being articulatingly connected with the one shaft, the other end of the guide rods being articulatingly connected to a respective end of the guide rods of a second guide rod pair, a middle guide rod articulatingly connected at both ends thereof to the respective other end of the guide rods of the second guide rod pair, a torque output joint for the other shaft articulatingly engaging the respective guide rods of the second guide rod pair between the respective articulating connection of the middle guide rod with the guide rods of the second guide rod pair and the respective articulating connection of the respective guide rods of the first guide rod pair with the guide rods of the second guide rod pair, the middle guide rod having a longitudinal axis extending at an inclination to a line extending through the central axis of the other shaft and disposed parallel to the respective longitudinal axis of the guide rods of the second guide rod pair, in nondeflected condition of the coupler, the torque output joint, respectively, being located beyond the middle of a connecting line extending between the articulating connection of the respective guide rod of the second guide rod pair and the respective guide rod of the first guide rod pair and the articulating connection of the middle guide rod and the respective guide rod of the second guide rod pair, the guide rods of the first guide rod pair having thereon a respective torque input joint for the one shaft and having a respective elongated portion thereof extending beyond the respective torque input joint so as to be statically balanced by the mass of the elongated portion. In contrast to the aforementioned heretofore known device, the torque output of the invention of the instant application is not located in the middle of the connecting line of the joints between the guide rods of both guide rod pairs and the joints between the middle guide rod and the respective guide rods of the second guide rod pair, but rather is laterally shifted from the middle thereof. Due to the inclination of the longitudinal axis, with respect to the axes of the guide rods of the first guide rod pair, a given angle invalidity i.e. an angular deviation between the one and the other shaft during the rotation is able to be balanced or equalized substantially. Through the features of the inventive device, each guide rod is statically balanced, furthermore, with respect to the pivot thereof.

In accordance with another feature of the invention, a connecting line between the respective torque output joints at the guide rods of the second guide rod pair and the longitudinal axes of the guide rods of the first guide rod pair extend parallel to one another.

In accordance with a further feature of the invention, an additional mass of a given amount is disposed at the guide rods of the second guide rod pair between the articulating connection of the respective guide rods of the first guide rod pair to the respective guide rods of the second guide rod pair and the torque output joint at the respective guide rods of the second guide rod pair, so as to statically balance the second guide rod pair as well as the middle guide rod. Because of these features, the force transmission device of the invention is subject to no imbalances in all guide rod deflection situations event at very high speeds of the respective rail car which correspond to high rotary speeds of the shaft.

In accordance with an additional feature of the invention, an angle $\alpha$ between an extension of the connecting line between both of the torque input joints and the connecting line of the respective articulating connections of the guide rods of both the guide rod pairs and the respective articulating connection of each of the guide rods of the second guide rod pair with the middle guide rod, as well as an angle $\beta$ between an extension of the connecting line between both of the torque output joints and the connecting line of the torque input joints and the respective articulating connection of the respective guide rods of the first and second guide rod pairs are equal and smaller than 90°. In this manner, a virtually angle-true synchronism of both shafts is attained.

Other features which are considered as characteristic for the invention are set forth in the appended claims.

Although the invention is illustrated and described herein as embodied in device for transmitting force from one shaft to another, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a diagrammatic view of a device for transmitting force from one shaft to another, according to the invention, wherein the connecting lines between the torque transmission joints extend parallel to the longitudinal axes of the guide rods of the first guide rod pair; and FIG. 2 is a view similar to that of FIG. 1 of another embodiment of the device wherein the connecting lines between the torque transmission joints extend at an inclination to the longitudinal axes of the guide rods of the first guide rod pair.

FIG. 3 is a perspective view, similar to that of FIG. 1, of a further embodiment of the device, including drive shaft, driven shaft, and discs;

FIG. 4 is a fragmentary view of the device of FIG. 3, shown in partial cross section of a joint between a guide rod and a pin, and;

FIG. 5 is a fragmentary view of the device of FIG. 3, shown in partial cross section of a joint between two guide rods.

Figure 1:
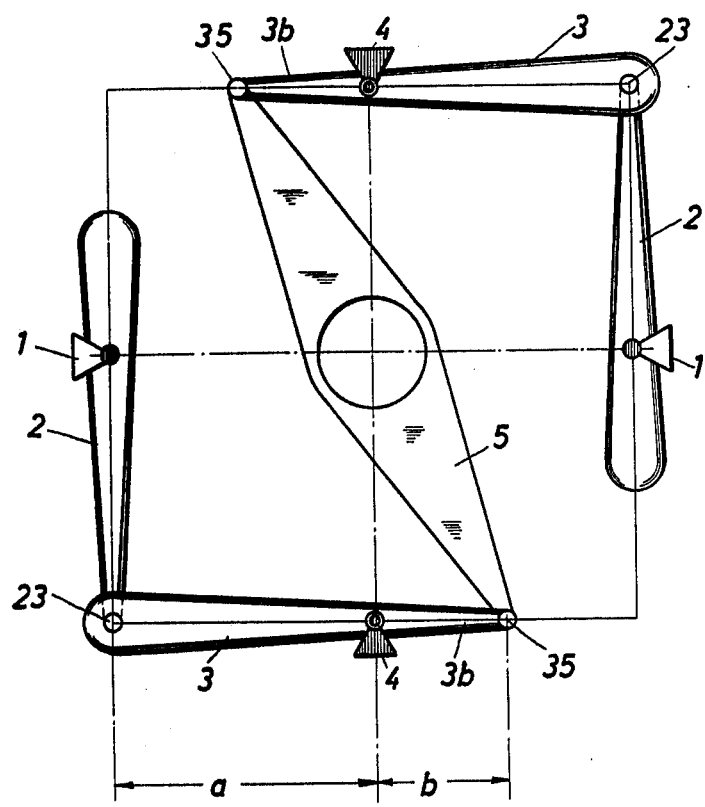

Referring now to the figures of the drawing, there are shown respective joints 1 of the torque input to guide rods 2 of a first guide rod pair. Guide rods 3 form a second guide rod pair. In the embodiment of FIG. 1, a connecting line between the torque input joints 1 extends, in the nondeflected condition of the coupling, parallel to the longitudinal axis of the guide rods 3 of the second guide rod pair. The joints between the guide rods 2 of the first guide rod pair and of the guide rods 3 of the second guide rod pair are identified by the reference numeral 23. Joints 4 of the torque output point are located on the guide rods 3 of the second guide rod pair. The joints 4 are situated beyond the middle of the connecting lines between the axes of the joints 23 and joints 35. The torque output joints 4 are so disposed in the embodiment of FIG. 1 that the connecting lines thereof, and the longitudinal axes of the guide rods 2 extend parallel to one another.

A so-called middle guide rod 5 articulatingly connects the ends of the guide rods 3 of the second guide rod pair to one another. The middle guide rod 5 is formed with a circular recess through which one or even both coupled shafts can extend. The articulating connections between the respective guide rods 3 of the second guide rod pair and the middle guide rod 5 are identified by reference numerals 35. The shafts per se are not illustrated in the drawing.

Furthermore, balancing or equalizing weights are provided on the guide rods 3 of the second guide rod pair in the vicinity of the joints 23, and additional balancing or equalizing masses at the ends of the guide rods 2 of the first guide rod pair outside or beyond the torque input joints 1.

In the perspective view of FIG. 3, the pin 11 may be part of the disc 12, as illustrated, or may be fastened thereto in any conventional manner. The drive shaft 13 is connected to the disc 12 and may extend therethrough into the recess formed in the middle guide rod 5, as explained above. The disc 12 is shown very narrow in the drawing so as not to obscure other parts of the device. The disc may be constructed as a circular plate from which the pins 11 extend. The pins 11 are connected to the guide rods 2 at the torque input points 1.

Similarly, the disc 42 has pins 41 at its outer edges which connect with guide rods 3 at the torque output joints 4. The driven shaft 43 and the pins 41 are connected to the disc 42 in a manner similar to the connection of the shaft 13 to the disc 12.

In a practical application of the force transmission device according to the invention, in an electrically driven vehicle, the disc 12 corresponds to the drive wheel and the disc 42 to the gear wheel of the drive. The shaft 13 is then the drive axle and shaft 43 is the axle of the gear unit.

The torque input or output connections are shown in detail in FIG. 4. The guide rod joints 23 are shown in detail in FIG. 5.

As described hereinafter, no imbalance forces occur in the device of the invention of the instant application for any selected deflections of the one shaft with respect to the other shaft.

The guide bars 2 of the first guide bar pair are shown in vertical position in the figures. Each of the guide bars 2 of the first guide bar pair is statically balanced with respect to the pivot point 1 by the aforementioned balancing or counterweights. The first pair of guide rods 2 engages the second pair of guide rods 3, which are disposed substantially perpendicularly to the first guide rod pair. The guide rods 3 of the second guide rod pair are divided, respectively, in a given ratio $a$ to $b$. The pivot point 4, respectively, representing the torque output, appears at the dividing location. Between the overhanging lever arms $3b$ of both guide rods 3, the diagonal or middle guide rod 5, which connects both guide rods 3 to one another, is located. The lever system formed of the guide rods 3 and the middle guide rod 5 is statically balanced by the application of balancing weights or through suitable structural shaping, as in the illustrated embodiments, so that the static equalization or balancing is provided in each guide rod-deflection value and also in each shaft or pivot position.

Figure 2:
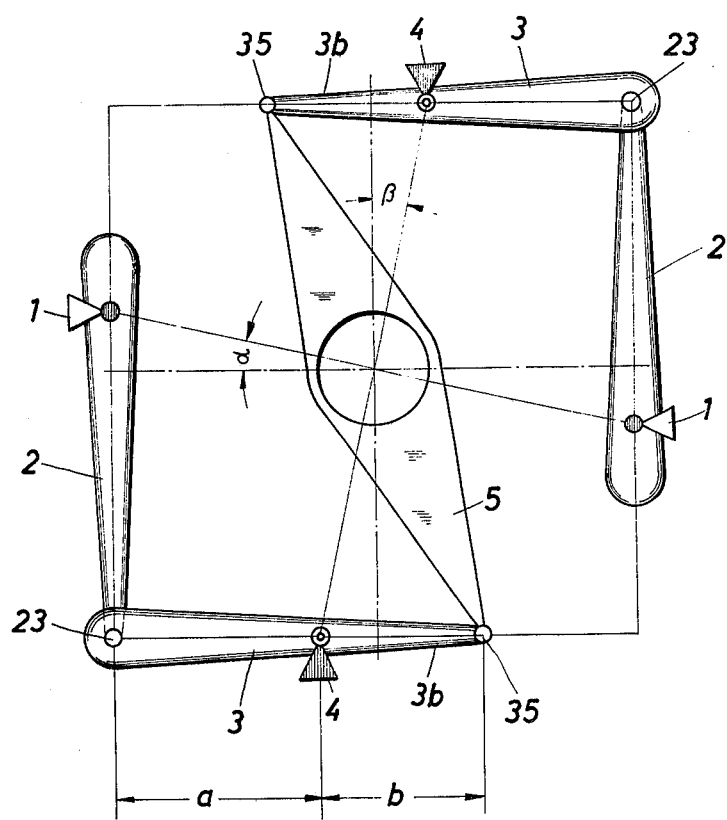

The force transmission device of FIG. 1 in the illustrated kinematic form affords a complete imbalance equalization but is subject to a given angle invalidity. This angle invalidity can be reduced to a minimum which corresponds to practical limits of use by adjusting the guide rod lengths and by effecting an angle shifted disposition of the torque input and/or output points to the guide rod position (angles $\alpha$ and $\beta$), in accordance with the embodiment of FIG. 2. Further in accordance with the latter embodiment, the connecting line of the torque output joints 4 is inclined at the angle $\beta$ with respect to the longitudinal axes of the guide rods 2 of the first guide rod pair. Similarly, the connecting line of the torque input joints 1 are inclined at the angle $\alpha$ with respect to the longitudinal axes of the guide rods 3 of the second guide rod pair. In the embodiment of FIG. 2, the angles $\alpha$ and $\beta$ are equal so that the connecting lines of the torque input joints 1 and the connecting lines of the torque output joints 4 are disposed perpendicularly to one another. A subsequent verification has established that the angle invalidities in the embodiment of FIG. 2 are especially low.

A further reduction in the angle invalidity is produced by forming the joints between the guide rods and the joints of the torque input and output as rubber joints, that is, abrasion-free and maintenance-free, through the thereby resulting radial elastic suspension of those members.

The embodiments of the invention in which an exclusive property or privilege is claimed are defined as follows:

1. Device for transmitting force from one shaft to another wherein the latter is displaceable in radial and axial direction relative to the one shaft, comprising a coupler including a first pair of guide rods, one end of the guide rods of said first guide rod pair being articulatingly connected with the one shaft, the other end of said guide rods being articulatingly connected to a respective end of the guide rods of a second guide rod pair, a middle guide rod articulatingly connected at both ends thereof to the respective other end of said guide rods of said second guide rod pair, a torque output joint for the other shaft articulatingly engaging the respective guide rods of said second guide rod pair between the respective articulating connection of said middle guide rod with said guide rods of said second guide rod pair and the respective articulating connection of the respective guide rods of said first guide rod pair with said guide rods of said second guide rod pair, said middle guide rod having a longitudinal axis extending at an inclination to a line extending through the central axis of the other shaft and disposed parallel to the respective longitudinal axis of said guide rods of said second guide rod pair, in nondeflected condition of said coupler, the torque output joint, respectively, being located beyond the middle of a connecting line extending between the articulating connection of the respective guide rod of said second guide rod pair and the respective guide rod of said first guide rod pair and the articulating connection of the middle guide rod and the respective guide rod of said second guide rod pair, said guide rods of said first guide rod pair having thereon a respective torque input joint for the one shaft and having a respective elongated portion thereof extending beyond the respective torque input joint so as to be statically balanced by the mass of said elongated portion.

2. Force transmission device according to claim 1 wherein a connecting line between the respective torque output joints at said guide rods of said second guide rod pair and the longitudinal axes of the guide rods of said first guide rod pair extend parallel to one another.

3. Force transmission device according to claim 1 including an additional mass of a given amount disposed at said guide rods of said second guide rod pair between the articulating connection of the respective guide rods of said first guide rod pair to the respective guide rods of said second guide rod pair and said torque output joint at the respective guide rods of said second guide rod pair, so as to statically balance said second guide rod pair as well as said middle guide rod.

4. Force transmission device according to claim 3 wherein an angle $\alpha$ between an extension of the connecting line between both of said torque input joints and said connecting line of the respective articulating connections of said guide rods of both said guide rod pairs and the respective articulating connection of each of said guide rods of said second guide rod pair with said middle guide rod, as well as an angle $\beta$ between an extension of the connecting line between both of said torque output joints and the connecting line of said torque input joints and the respective articulating connection of the respective guide rods of said first and second guide rod pairs are equal and smaller than 90°.

* * * * *